United States Patent
Ceisel et al.

(10) Patent No.: US 12,000,702 B2
(45) Date of Patent: Jun. 4, 2024

(54) DYNAMIC GYROSCOPE BIAS OFFSET COMPENSATION

(71) Applicant: Honeywell International Inc., Morris Plains, NJ (US)

(72) Inventors: Ahren Ceisel, Freeport, IL (US); Brian Marsh, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 282 days.

(21) Appl. No.: 16/226,279

(22) Filed: Dec. 19, 2018

(65) Prior Publication Data

US 2020/0200537 A1 Jun. 25, 2020

(51) Int. Cl.
G01C 19/5776 (2012.01)
E02F 9/26 (2006.01)
G01C 25/00 (2006.01)

(52) U.S. Cl.
CPC ............ *G01C 19/5776* (2013.01); *E02F 9/26* (2013.01); *G01C 25/00* (2013.01)

(58) Field of Classification Search
CPC .... G01C 19/5776; G01C 25/00; G01C 21/18; E02F 9/26; G01P 13/00; G01S 19/53
See application file for complete search history.

(56) References Cited

U.S. PATENT DOCUMENTS

| 5,736,923 A * | 4/1998 | Saab ...................... G01C 21/18 340/429 |
| 6,401,036 B1 | 6/2002 | Geier et al. |
| 7,587,277 B1 * | 9/2009 | Wells ................... G01C 21/165 701/510 |
| 2008/0269988 A1 * | 10/2008 | Feller ................... G05D 1/0278 701/41 |
| 2011/0115913 A1 * | 5/2011 | Lang ..................... B60K 35/00 348/148 |
| 2013/0031948 A1 * | 2/2013 | Lignon ................ G01C 19/567 73/1.38 |

(Continued)

FOREIGN PATENT DOCUMENTS

CN 102967313 B 10/2015

OTHER PUBLICATIONS

Jason Lloyd Sherrett, A comparison of navigation systems based on inertial sensor selection and configuration, ProQuest, 2013, pp. i-ix and 1-14, ProQuest Dissertations Publishing, United States. Retrieved from the Internet <https://search.proquest.com/docview/1412695184>.

*Primary Examiner* — Faris S Almatrahi
*Assistant Examiner* — Andrew J Cromer
(74) *Attorney, Agent, or Firm* — Alston & Bird LLP (57) ABSTRACT

Apparatus and associated methods relate to a vehicle attitude estimated as a function of predicted acceleration from the vehicle control system. In an illustrative example, a weighting module may dynamically combine IMU (Inertial Measurement Unit) with sensor motion data motion profile information from the vehicle control system. The weighting module may receive the predicted acceleration information via a data link with the vehicle control system. The dynamic weighting of inputs may be processed by an attitude estimator. An estimated attitude may be supplied to a display device, for example, to represent a real-time spatial orientation of the vehicle with respect to the gravity vector.

15 Claims, 5 Drawing Sheets

(56) References Cited

U.S. PATENT DOCUMENTS

2013/0066578 A1* 3/2013 Tu .................. G01C 25/005
                                           702/87
2015/0237223 A1* 8/2015 Fung ................ H04N 23/57
                                           348/207.1
2016/0230367 A1* 8/2016 Hendron ............ E02F 3/7627

* cited by examiner

DYNAMIC GYROSCOPE BIAS OFFSET COMPENSATION

TECHNICAL FIELD

Various embodiments relate generally to electronic sensing of angle offsets from a gravity vector.

SUMMARY

Apparatus and associated methods relate to a vehicle attitude estimated as a function of predicted acceleration from the vehicle control system. In an illustrative example, a weighting module may dynamically combine IMU (Inertial Measurement Unit) with sensor motion data motion profile information from the vehicle control system. The weighting module may receive the predicted acceleration information via a data link with the vehicle control system. The dynamic weighting of inputs may be processed by an attitude estimator. An estimated attitude may be supplied to a display device, for example, to represent a real-time spatial orientation of the vehicle with respect to the gravity vector.

In-Motion Detection: Apparatus and associated methods relate to an In-Motion detection algorithm employing measurements from a gyroscope and an accelerometer, the algorithm generating an In-Motion signal in response to variances of gyroscope measurements and/or accelerometer measurements greater than a predetermined error threshold. In various embodiments, a gyroscope bias compensation function is dynamically performed when the In-Motion signal indicates a stationary state of the vehicle. The gyroscope bias compensation function adjusts the gyroscope bias measurements to compensate for inherent Bias Instability (BI) within the gyroscope. In an illustrative example, in vehicles without a Global Positioning System (GPS) receiver or a speedometer, the performance of inclination estimation algorithms may be improved by employment of the In-Motion signal.

Weighting: Apparatus and associated methods relate to an Inertial Measurement Unit (IMU) including a gyroscope, an accelerometer and an inclination algorithm, the inclination algorithm further employing a Kalman filter, and a dynamic weighting function to provide one or more inclination results based on gyroscope and accelerometer measurements, the weighting function decreasing the weighting of the accelerometer data within the Kalman filter when the accelerometer estimate of the gravity vector disagrees with the gyroscope estimate.

Various embodiments may achieve one or more advantages. For example, some embodiments implemented on a vehicle may reliably differentiate between the stationary and In-Motion states, improving two valuable features for an attitude estimation algorithm. For example, the differentiation may allow the gyroscope bias to be updated while the vehicle is stationary, which may advantageously improve the accuracy of the attitude measurements, particularly during vehicle motion. In some examples, the differentiation may avoid incorporation of translational acceleration artifacts into pitch and roll estimates.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case scenario is briefly introduced with reference to FIG. 1. Second, with reference to FIG. 3A and FIG. 3B, exemplary flowcharts illustrating various calculations are presented. Next, with reference to FIG. 4, a block diagram of a mobile inclinometer system, details an exemplary Inertial Measurement Unit (IMU) adapted to dynamically estimate attitude in response to inputs that include information communicated from a vehicle engine control unit (ECU) via a communication link.

Figure 1:
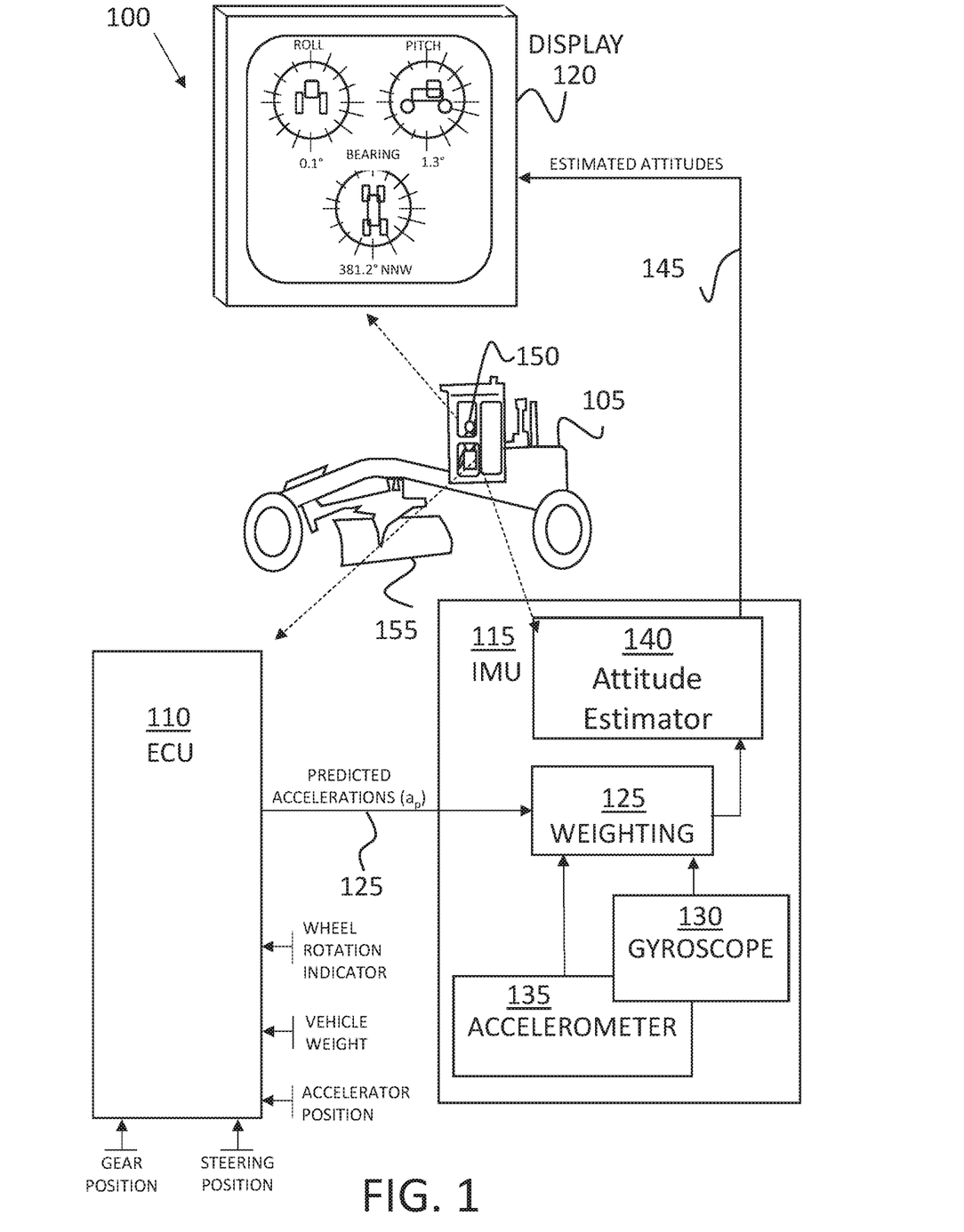
FIG. 1 depicts a block diagram view of an exemplary Inertial Measurement Unit (IMU) operatively coupled to receive and process predicted motion profile data from a vehicle control system.

FIG. 1 depicts a block diagram view of an exemplary Inertial Measurement Unit (IMU) operatively coupled to receive and process predicted motion profile data from a vehicle control system. In the depicted example, a vehicle road grading scenario 100 includes a road grader vehicle 105 designed to grade a surface, such as a road or construction site, at a prescribed angle with respect to Earth's gravity vector. The road grader vehicle 105 includes an engine control unit (ECU) 110 that operates the vehicle in response to sensor inputs and operator controls. To provide spatial orientation information to the operator, the road grader vehicle 105 further includes an inertial measurement unit (IMU) 115 that estimates vehicle orientation based on gyroscopic and accelerometer sensors, and supplies estimated vehicle orientation to an orientation display device 120 monitored by the operator to achieve the prescribed grade. The ECU 110 generates information that correlates to the motion profile and/or orientation of the road grader vehicle 105. The road grader vehicle 105 further includes a communication link 125 to communicate the generated information, including predicted acceleration data (ap), from the ECU 110 to the IMU 115. The IMU 115 receives and processes the predicted acceleration data (ap). The IMU 115 dynamically estimates spatial orientation of the road grader vehicle as a function of the predicted acceleration data, in combination with the gyroscopic and/or accelerometer sensor inputs, to advantageously improve, for example, the accuracy and/or reliability of the estimated orientation supplied to the display device 120.

The ECU 110 is operatively coupled to receive sensor inputs that indicate, among other things, the motion profile of the road grader vehicle 105. For example, sensor inputs to the ECU 110 may include, by way of example and not limitation, gear position, wheel rotation indicator, and/or vehicle weight.

The ECU 110 is also operatively coupled to receive operator control inputs that indicate, among other things, the motion trajectory of the vehicle. For example, operator control inputs to the ECU 110 may include, by way of example and not limitation, steering inputs, gear position (e.g., forward, reverse, neutral), brake control inputs, throttle position, and/or accelerator control inputs.

The IMU 115 includes a dynamic weighting module 125 configured to dynamically determine and apply weighting factors to the various input signals that are used to estimate spatial orientation of the road grader vehicle 105. In this embodiment, the weighting module 125 receives inputs that include the predicted acceleration signals from the ECU 110, in addition to real time input signals from the gyroscopic sensor 130 and accelerometer sensor 135. They dynamic weighting module 125 may include, in some embodiments, a Kalman filter, for example.

The IMU 115 further includes an attitude estimator module 140 that is configured to generated estimated orientation of the road grader vehicle 105. The attitude estimator module 140 receives weighted signals from the dynamic weighting module 125. The IMU 125 may execute various algorithms, and may calculate roll, pitch and yaw (bearing) for the road grader 105 based on the weighted signal information (predicted acceleration, gyroscope, accelerometer) from the dynamic weighting module 125.

The predicted acceleration signals, gyroscopic signals, and the accelerometer signals may all include three dimensional components, in some applications. For example, a three dimensional components may be processed, in the IMU 115, to resolve into a predetermined coordinate system, such as rectangular coordinate system. In some examples, a polar coordinate system may be used. In some embodiments, the IMU 115 may resolve the spatial orientation into components that may include, for example, roll, pitch, yaw and/or bearing.

The road grader vehicle 105 further includes a communication link 145 from the IMU 115 to the display device 120. The roll, pitch and yaw (bearing) parameters may be transmitted across the link 145 for display on the display device 120.

The display device 120 may present, for example, one or more analog and/or digital representations of the spatial orientation. For example, some representations may include pitch and/or a readout of number of degrees (e.g., roll=−2.7 degrees) rotation about a predetermined axis.

The display device 120 may present various data and/or various graphics to portray the roll, pitch and yaw (bearing) parameters to an operator 150. For example, the display device 120 may display a vehicle graphic, rolled, tilted, or pointed in response to actual vehicle roll, pitch and yaw. In some embodiments, a digital readout of the roll, pitch and yaw may be displayed. The display 120 may, for example, present the spatial orientation information for the main rigid structure of the road grader vehicle 105 alone or in combination, for example, with presenting the spatial orientation information for an implement 155 that articulates with respect to the main rigid structure of the road grader vehicle 105.

In some embodiments, the ECU 115 may provide a partial set of parameters to the IMU 125 to aid in the calculation of roll, pitch and yaw (bearing). For example, the ECU 115 may send predicted acceleration parameters ($a_p$) to the IMU 125. The ECU 115 may be operable to calculate the predicted acceleration parameters based on inputs to the ECU 115 (e.g., gear position, steering position, accelerator position, brake position, vehicle weight, wheel rotation indicators).

In an illustrative example, by employment of the IMU 115, the operator 150 of the road grader 105 may advantageously measure the grade of a surface that the road grader vehicle 105 is driving on, without having to exit the road grader vehicle 105 and without having to call a specific crew to take the measurements.

In an illustrative example, the IMU 115 may be mounted on a blade 155 of the road grader 105. In this example, the operator 150 may advantageously measure the grade of the surface formed by the blade 155, again without having to exit, and without having to call a specialized crew.

Vehicle orientation information is communicated along the links 125, 145. In some examples, the links 125, 145 may be integrated into a single common data bus. In some applications, one or more portions of the data links 125, 145 may be formed as a wired (e.g., galvanic) connection. The links 125, 145 may operate, in some embodiments, using an asynchronous protocol, for example, to transport information related to estimating vehicle spatial orientation, in the form of digital data, from a source node on the vehicle to a destination node on the vehicle.

In some implementations, the links 125, 145 may operate under different protocols. By way of example and not limitation, the link 125 may communicate in an asynchronous mode, and the link 145 may communicate in a synchronous mode. In various examples, one or more communication nodes may serve as a master mode, while the other nodes on that same link may function in a slave mode relative to the master node.

In some embodiments, the IMU 115 may be mounted to the frame of the road grader vehicle 105 in a prescribed manner, to report substantially zero pitch and zero roll when the road grader 105 is positioned on level ground (e.g., orthogonal with respect to the gravity vector).

Figure 2:
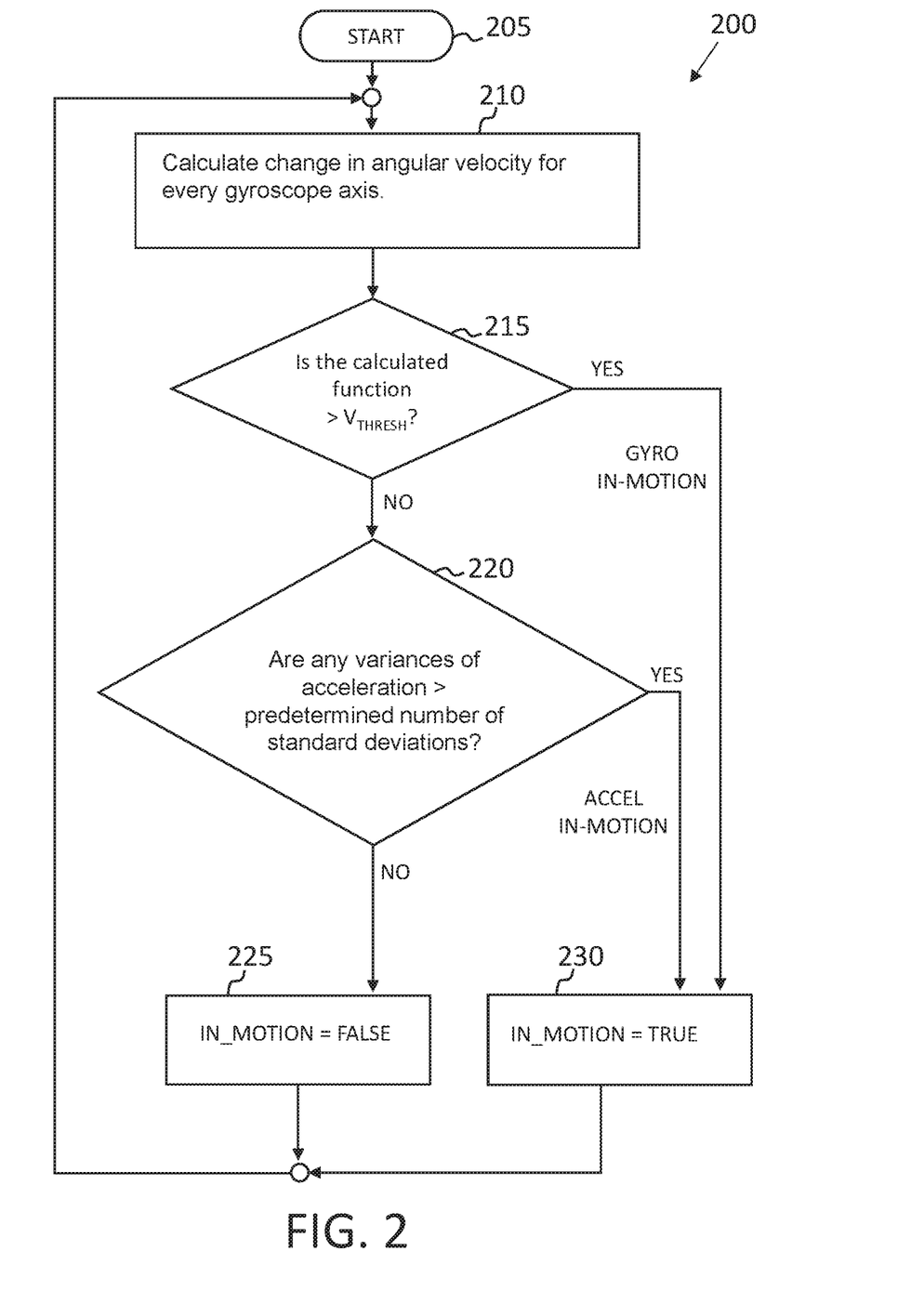
FIG. 2 depicts a flowchart of an exemplary In-Motion detection algorithm.

FIG. 2 depicts a flowchart of an exemplary In-Motion detection algorithm. In an illustrative example, the method described in FIG. 2 may be performed by a processor system in the IMU 115 of FIG. 1, such as in cooperation with the attitude estimator 140, for example.

An In-Motion detection algorithm 200 begins at 205. At 210, a change of angular velocity is calculated for every gyroscope axis. At 215, if the change calculated at 210 is greater than a predetermined threshold, $V_{THRESH}$, then the vehicle/gyroscope is determined to be In-Motion, and then the In-Motion Boolean is set to true at 230. Execution then returns to 210.

At 215, if the change calculated at 210 is not greater than a predetermined threshold, $V_{THRESH}$, then the vehicle/gyroscope does not indicate motion. Next, at 220, if any of the variances of the components of acceleration is greater than a predetermined threshold (e.g., number of standard deviations), then the accelerometer/vehicle is determined to be in motion, and then the In-Motion Boolean is set to true at 230.

However, at 220, if any of the variances of the components of acceleration is not greater than a predetermined threshold (e.g., number of standard deviations), then the accelerometer/vehicle is determined to be stationary, and at 225, the In-Motion Boolean is set to false. Execution then returns to 210.

Execution of the In-Motion detection algorithm 200 is continuous. For example, the In-Motion detection algorithm 200 may be a timed interrupt routine. Accordingly, the In-Motion Boolean flag may be globally accessed. In some object-oriented examples, the In-Motion Boolean flag may be a parameter within a code object or structure.

Figure 3A:
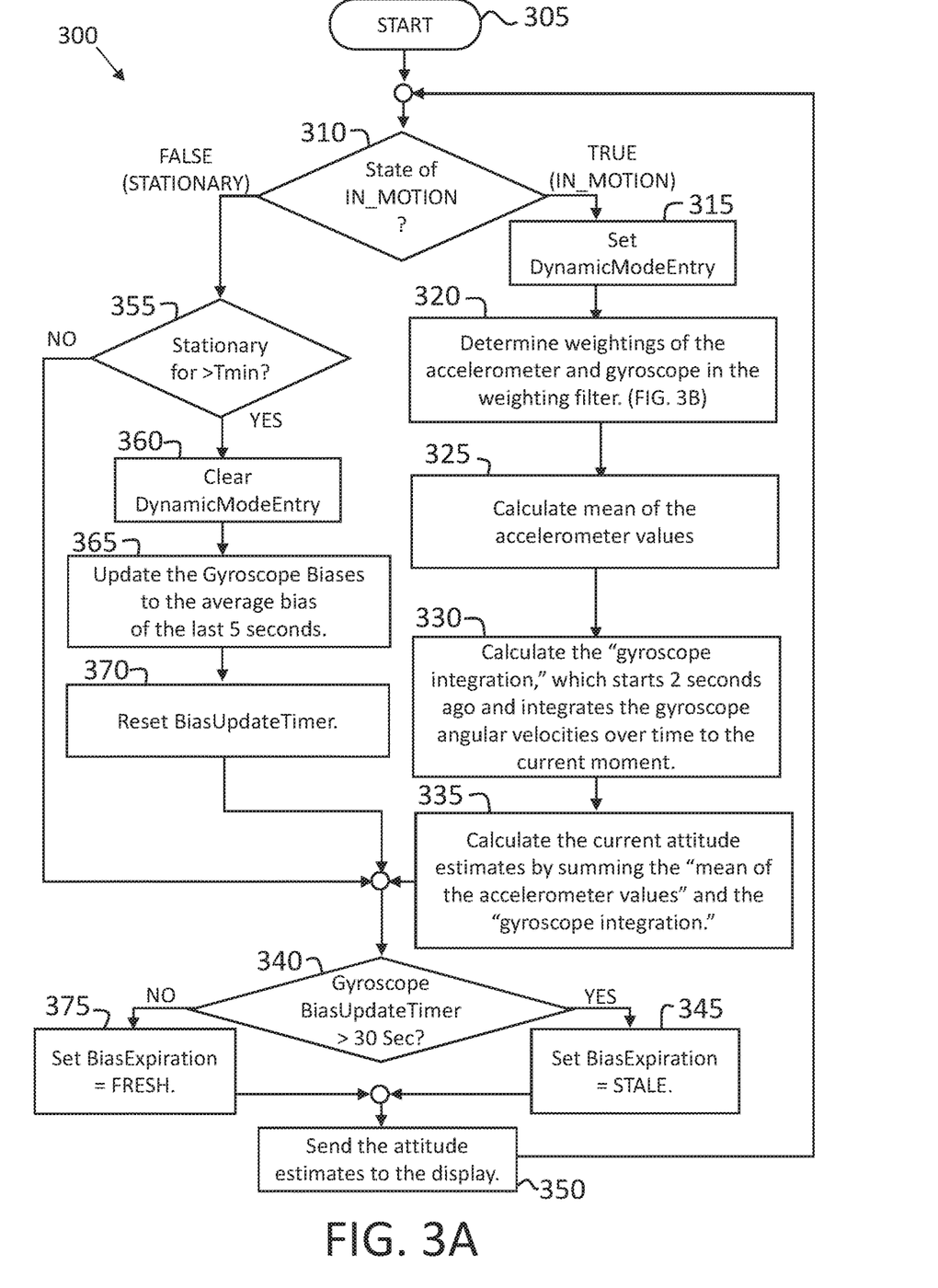
FIG. 3A depicts a flowchart of an exemplary attitude calculation algorithm.

FIG. 3A depicts a flowchart of an exemplary attitude calculation algorithm. In an illustrative example, the method described in FIG. 3 may be performed by a processor system in the IMU 115 of FIG. 1, such as in cooperation with the attitude estimator 140 alone or in combination with the dynamic weighting module 125, for example.

An attitude calculation algorithm 300 begins at 305. With reference to FIG. 2, if the state of the In-Motion Boolean flag is true at 310, indicating that the vehicle is in motion, execution proceeds to 315. At 315, a dynamic mode entry flag is set. At 320, the weightings of the accelerometer and gyroscope are adjusted, for example, by the dynamic weighting module 125C.

Next, at 325, a "mean of the accelerometer values" is calculated. In an illustrative example, the "mean of the accelerometer values" may be a one-second average where the accelerometer samples are centered around two seconds ago ($k_{-200}$+/−50), and where an exemplary sample rate is 10 ms.

Then, at 330, a "gyroscope integration" is calculated. In an illustrative embodiment, the "gyroscope integration" may start, for example, two seconds ago ($k_{-200}$) and integrates the gyroscope angular velocities over time to the current moment ($k_0$).

Execution then proceeds to 335, where the current attitude estimates are calculated by combining (e.g., summing) the results of 325 and 330.

Next, at 340, if the gyroscope bias update timer is greater than a predetermined time (e.g., 30 seconds), then execution continues to 345 where the BiasExpiration is set to "Stale." However, if the gyroscope bias update timer is not greater than a predetermined time (e.g., 30 seconds), then execution continues to 375 where the BiasExpiration is set to "Fresh." After 345 or 375, execution continues to 350.

At 350, the combination value from 335 is sent for display, such as on the display device 120 of FIG. 1, for example. Execution then returns to 310.

At 310, if the state of the In-Motion flag is false, indicating that the vehicle is in stationary, execution proceeds to 355.

At 355, if the vehicle has been stationary for more than a minimum time period, Tmin (e.g., 1-10 seconds), then execution proceeds to 360. At 360, the dynamic mode entry flag is cleared. Execution then proceeds to 365, where the gyroscope biases are updated to the average bias of the last predetermined time interval (e.g., about five seconds). Execution then proceeds to 370, where the BiasUpdateTimer is reset. Execution then proceeds to 340.

However, at 355, if the vehicle has been stationary for less than or equal to a minimum time period, Tmin (e.g., 1-10 seconds), then execution proceeds to 340.

Execution of the attitude calculation algorithm 300 may continuously repeat. However, in some embodiments, the attitude calculation algorithm 300 may be a timed interrupt routine. In various examples, the attitude calculation algorithm 300 may be a background routine within a main process flow.

Figure 3B:
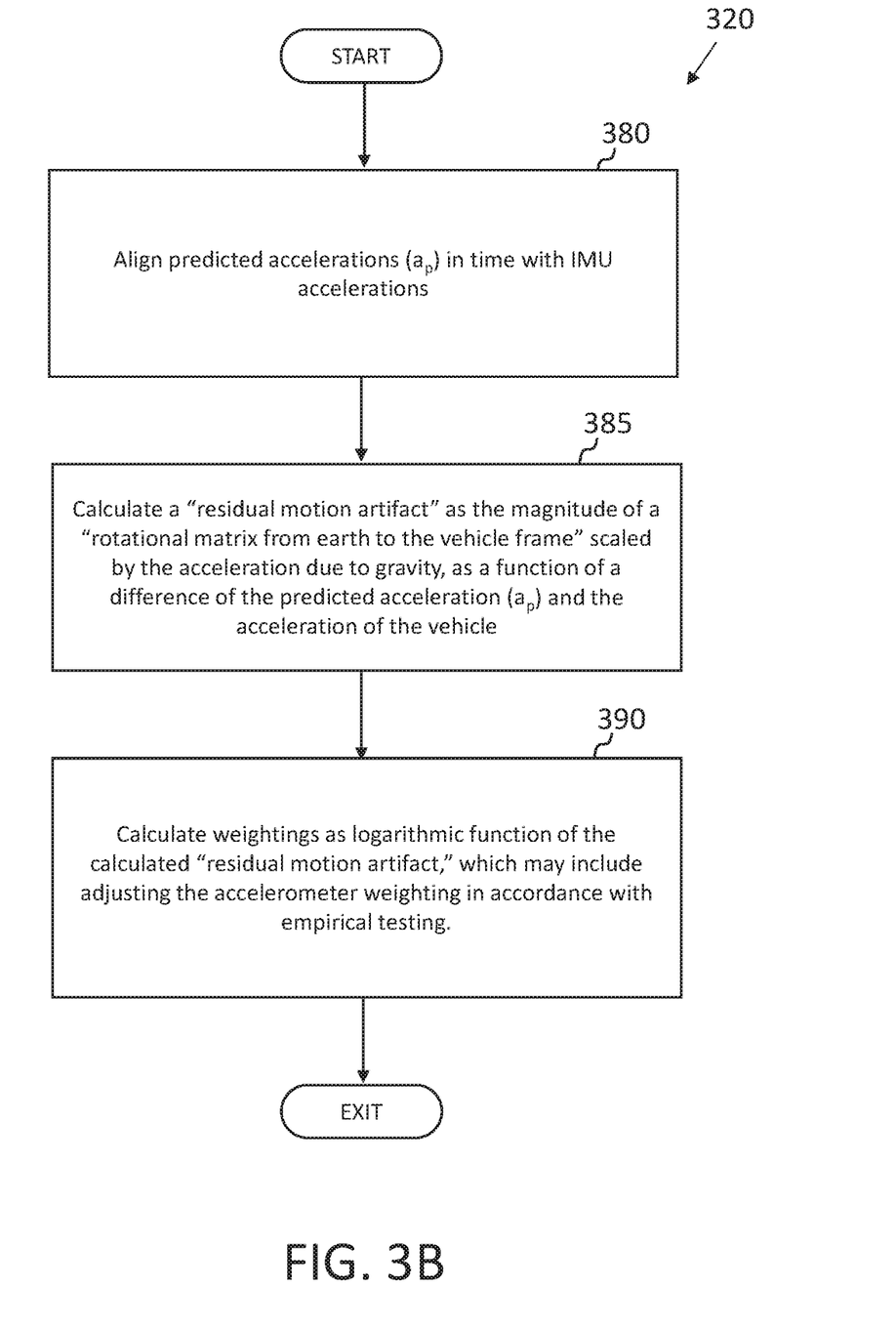
FIG. 3B depicts a flowchart of an exemplary predicted acceleration weighting algorithm responsive to predicted acceleration information supplied by the vehicle control system.

FIG. 3B depicts a flowchart of an exemplary predicted acceleration weighting algorithm responsive to predicted acceleration information supplied by the vehicle control system. In the depicted example, the weighting calculation algorithm 320 of FIG. 3A may further include detail as disclosed in FIG. 3B.

At 380, the predicted accelerations ($a_p$) are aligned in time with IMU 115 accelerations. With reference to FIG. 1, this temporal alignment may reduce or substantially remove non-deterministic delays that temporally shift the predicted accelerations data relative to the real time IMU 115 sensor data received from the accelerometers 135 and/or gyroscopes 130.

At 385, the weighting module 125, for example, may compute a "residual motion artifact" as the magnitude of a "rotational matrix from earth to the vehicle frame," scaled by the acceleration due to gravity, and as a function of the difference of the predicted acceleration ($a_p$) and the acceleration of the vehicle.

Execution continues to 390, where a "weighting" as the inverse of the log of the magnitude of the "residual motion artifact" divided by a first constant, and raised to the power of a second constant may be calculated. The first constant may, for example, ensure a positive log value. The second constant may adjust the severity of the accelerometer de-weighting. In some implementations, the accelerometer weighting may be adjusted in accordance with empirical testing.

Figure 4:
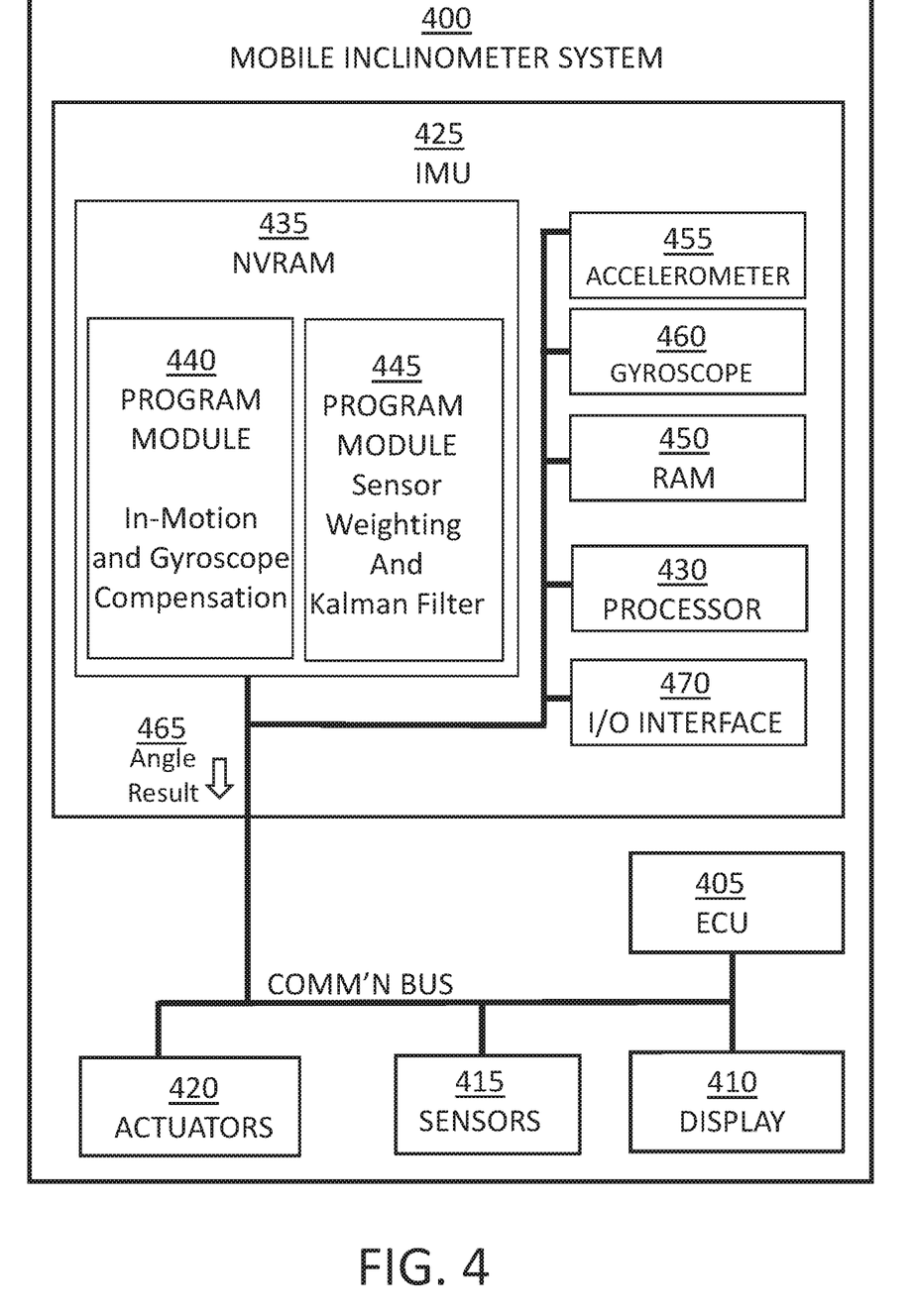
FIG. 4 depicts a block diagram view of a mobile inclinometer system.

FIG. 4 depicts a block diagram view of a mobile inclinometer system. A mobile inclinometer system 400 includes an Electronic Control Unit (ECU) 405. The ECU may act as the main control computer to the system 400. The mobile inclinometer system 400 also includes a display 410. The display 410 may be mounted near a vehicle operator, and may provide visual information of the vehicle attitude. The mobile inclinometer system 400 also includes various sensors 415. This collection of sensors 415 may include thermal sensors, force sensors, accelerometers, and/or various switches. The system 400 also includes various actuators 420. Actuators 420 employed may include various motors and/or linear actuators. The system 400 also includes an inertial measurement unit (IMU) 425. The IMU is controlled by a processor 430. The processor 430 is supported by a program memory otherwise known as nonvolatile random-access memory (NVRAM) 435. The NVRAM 435 may be programmable and may carry the program instructions for the processor 430.

The NVRAM 435 includes at least two programming modules: an "In-Motion and gyroscope compensation program module" 440, and a "Sensor weighting and Kalman and filter program module" 445. Examples of steps performed by the "In-Motion and gyroscope compensation program module" 440 are described with reference to 3A. Examples of steps performed by the "Sensor weighting and Kalman and filter program module" 445 are described with reference to FIG. 3B. Further, in various examples, where the IMU 425 receives predicted accelerations from the ECU 405, FIG. 3B is employed. In various examples, where the IMU does not receive predicted accelerations, conventional IMU operation may be employed.

The "In-Motion and gyroscope compensation program module" 440, may be operable to detect when a host vehicle is in motion, and to compensate for gyroscopic offset when the vehicle is stationary. The "Sensor weighting and Kalman and filter program module" 445 may be operable to produce substantially accurate inclination values by employment of a weighting function which feeds a Kalman filter. (Refer to the descriptions that follow.)

The processor 430 is also supported by a RAM 450. The RAM 450 may provide the scratchpad memory needed for basic operation of the processor 430. The processor also communicates with two sensors: an accelerometer 455 and a gyroscope 460. The accelerometer 455 and the gyroscope 460 may be employed by the processor 430 to ultimately determine an inclinometer angle result 465. (Refer to the descriptions that follow.) The processor is also in communication with an I/O interface module 470. The I/O interface module may provide, for example, an interface to a field programmer, and/or a digital diagnostic tool.

Gating Function (Motion Detection)

An IMU motion detection algorithm may rapidly detect the start of the motion of a vehicle, with minimal false positives caused by vehicle vibration. The IMU motion detection algorithm may include a "Gyro In-Motion" component and a "Accelerometer In-Motion" component.

The "Gyro In-Motion" may employ an approximated variance calculation. The approximated variance equation may evaluate the sum of the squares of the difference between functions of angular velocity for every axis. The sum, when above a predetermined threshold ($V_{THRESH}$), may detect a true In-Motion state. In some examples, variance may be calculated by taking the difference between samples taken at a predetermined time interval (e.g., 50 ms).

In some embodiments, variances in gyroscope measurements over substantially small time-windows (e.g., 50 ms) may be calculated to rapidly identify the vehicle In-Motion state. Because the gyroscope signals may be substantially insensitive to vibration, changes in the vehicle engine speed and other causes of changes in the vibration environment may have substantially minimal effects. Because the IMU motion detection algorithm may be based on differences between subsequent gyroscope measurements, the algorithm may accurately calculate the In-Motion state for substantially large gyroscope bias values.

The primary utility of the IMU In-Motion signal may be to detect a slow acceleration from rest, which may not quickly trigger the gyroscope in-motion detection. Therefore, the "Accelerometer In-Motion" may employ a logic equation to detect a "transition into" a true dynamic In-Motion state when any of the variances of the rectangular components of acceleration are above a predetermined number of standard deviations (e.g., 10). The qualifier "transition into" is used here, since, once the vehicle is in motion, the variance can become very large and may generate a large number of false negatives.

In some embodiments, vehicle motion detection may be detected when exceeding a predetermined threshold for maximum gyroscope measurements. In some examples, vehicle In-Motion may be detected when exceeding a predetermined threshold for "maximum change in accelerometer measurements."

In an illustrative example, field data may be collected with an IMU mounted on the target vehicle. From this field data, the variation of accelerometer or gyroscope measurements over a desired time window may be compared between known stationary and In-Motion states, to set a reasonable threshold for the variation.

Gyroscope Offset Drift Compensation

The gyroscopes in an IMU may be used to aid in estimating attitude during motion, but the zero-offset bias (the output when the sensor is stationary) may drift, leading to unpredictable errors. To mitigate this, the gyroscope bias may be updated by measuring its output during a time when the sensor is known to be stationary. Reliable differentiation between the "stationary" and "In-Motion" states may allow the gyroscope bias to be updated, and may improve the accuracy of the attitude measurement, especially during motion.

In an illustrative example, Angle Random Walk (ARW) refers to the error accrued when integrating a noisy gyroscope signal. This may occur even with no error in the bias. Bias Instability (BI) is another measure which quantifies the tendency of the gyroscope bias to drift.

Knowledge that the vehicle has started moving (the gating function) may be employed to increase the weighting of gyroscope readings compared to accelerometer readings, as the latter become much less reliable during motion.

Reliable differentiation between the "stationary" and "In-Motion" states may aid in avoiding the incorporation of "translational acceleration artifacts" into pitch and roll estimates. For example, when a vehicle starts driving forward, it may undergo a translational acceleration on the longitudinal axis, which may be misinterpreted as a change in the relative direction of the gravity vector.

An exemplary gyroscope bias compensation algorithm may update the gyroscope bias value only when a vehicle is detected to be stationary (not In-Motion). As such, when the vehicle is In-Motion, the gyroscope bias value may be left unchanged. In some examples, gyroscope variances within the Kalman filter may be adjusted.

In an illustrative example, the gyroscope estimate of the current attitude may be calculated. The calculation may be a summation of the "mean of the accelerometer values" and the "gyroscope integration." In some examples, a first term, the "mean of the accelerometer values" may be a one-second average, the accelerometer samples centered 2 seconds ago ($k_{-200}$+/-50). A second term, the "gyroscope integration," may start 2 seconds ago ($k_{-200}$) and integrate the gyroscope angular velocities over time to the current moment ($k_0$). In each term in this example, the samples (k) may be taken every 10 milliseconds (100 Hz rate).

If the time-passed since the last gyroscope bias update exceeds a predetermined threshold (e.g., 30 seconds) then a freshness value may be set to "stale." In some embodiments, the time-passed since the last gyroscope bias update may also elapse during the stationary state.

In some examples, if the vehicle is stationary for a predetermined time-period (e.g., 5 seconds), the algorithm may reset a dynamic mode entry flag. The dynamic mode entry flag may indicate the stationary or in-motion state of a vehicle. It may be set when any of the in-motion flags are true. It may be reset after a predetermined delay of all in-motion flags being false. If the vehicle has been stationary for 5 seconds then the gyroscope bias (be) is updated to the average bias of the last 5 seconds of that gyroscope.

Gyroscope and Accelerometer Weighting

A predicted acceleration weighting factor may include a residual motion artifact magnitude. The predicted acceleration weighting factor may include a constant $k_1$ to ensure a positive logarithmic result. The predicted acceleration weighting factor also may include a constant $k_2$ to adjust the strength of accelerometer deemphasis. In various examples, a vehicle system parameter, a predicted acceleration ($a_p$) may be included in the weighting factor. The predicted acceleration ($a_p$) may be based on various vehicle parameters. For example, the predicted acceleration ($a_p$) may be a scaled accelerator pedal position or brake pedal position. In some examples, the scale may include a vehicle weight. In some embodiments, the predicted acceleration may be scaled by -1 when the vehicle is in reverse gear. In yet other examples, the predicted acceleration may be a result of processing the vehicle wheel rotation feedback, or vehicle speed. Various steering feedback (e.g., steering wheel, joysticks) may also be used to calculate predicted acceleration. The vehicle system may use one or more of the inputs discussed to calculate a predicted acceleration. Accordingly, once calculated, the predicted acceleration may be transmitted over the (wired or wireless) communication bus or may be used directly within the IMU.

In some examples, the weighting factor is based on the current timeframe only. In some examples, the predicted acceleration ($a_p$) may not be included in the weighting factor.

In various examples, a triaxial gyroscope and a triaxial accelerometer may be configured within an IMU system. The accelerometer may provide a measurement of the pitch and roll at any given time. The gyroscope may provide an estimate of the change in orientation over a given time. The system may initially use the static accelerometer estimate to determine attitude. By employment of the gyroscope, during use, the system may also provide an estimate of the change of the pitch and roll values. By virtue of using the gyroscope, those pitch and roll values may be less susceptible to artifacts caused by accelerations due to various motions of the vehicle and due to outside noise.

In some examples, weighting may be based on some retention of data in memory (data history), which may advantageously provide a substantially fast response time (high-pass filtering effect). The calling function of various exemplary algorithms may execute the weighting algorithm at a predetermined frequency (e.g., 10 Hz). The algorithms may maintain a measure of the accelerometer mean error over the last time-steps as well as the accelerometer maximum error. Should there be a sudden rise in the acceleration error (corresponding to a vehicle suddenly starting to move) the maximum may rise. The weighting value may decrease in response to the rise in the maximum acceleration error. A decrease in the weighting value may deemphasize the accelerometer factor within the Kalman filter. Accordingly, various exemplary algorithms used may be considered to function as a bandpass filter, as the accelerometer maximum error processing may have a substantially fast response time, and the accelerometer mean error may create a low-pass filter effect.

In some embodiments, the weighting algorithm may maintain a history of the acceleration mean error so that coincidental matchups (substantially high correlation between the gyroscope measurements and the accelerometer measurements) may be prevented from causing accelerometer over emphasis. In addition, the acceleration error maximum may provide a rapid response due to a sudden introduction of accelerometer error. The accelerometer mean error and the accelerometer maximum error may be factored together to produce and acceleration weighting multiplier, that may be employed to increase the variance in the Kalman filter for the accelerometers.

In some examples, the weighting algorithm may indicate how well the change in angle according to the accelerometers matches up to the change in angle according to the gyroscopes. If there is a large difference, either on average over a predetermined time period or if there was just a large spike in the last predetermined time period, the algorithm may decrease the weighting of the accelerometers.

Various implementations have been described. Nevertheless, it will be understood that various modification may be made. For example, advantageous results may be achieved if the steps of the disclosed algorithm were performed in a different sequence. Accordingly, there may be other ways to accomplish the same thing with somewhat different implementations.

In an exemplary concept, an accelerometer's change in pitch and roll is compared with a gyroscope's measurement of pitch and roll over a predetermined time period (e.g., 100 ms). The accuracy of the accelerometer may be determined by the correlation of the accelerometer's change and the gyroscope's measurement. If the correlation is below a predetermined threshold, the accelerometer measurements may be deemed inaccurate. The accelerometer inaccuracies may be due to motion that is creating artifacts that may be obscuring the gravity vector in the accelerometer reading.

In an illustrative example, gyroscopes may be accurate over small periods of time, however when integrated over large periods of time, the small errors may accumulate to something unacceptable. Accordingly, within a hundred-millisecond time-frame the gyroscope may be substantially accurate. Therefore, within that time-period when the gyroscope and the accelerometer appeared to be correlated, the IMU may heavily weight the accelerometer signal inside the Kalman filter. In such examples, the gyroscopes may be employed to aid in the determination of when the accelerometers are giving a reliable signal. This method may vary from application to application because of the way each application moves in space.

In an exemplary embodiment, an algorithm may monitor the mean and variance for each gyroscope over m intervals of n samples. The variance is calculated for each gyroscope. If the variance is below a predetermined threshold, then the gyroscope bias value may be updated. If the variance is above the predetermined threshold, then the gyroscope bias value may be left unchanged.

Although various embodiments have been described with reference to the figures, other embodiments are possible. For example, the described algorithms may be implemented in the firmware of an attitude estimation device (IMU, AHRS, electronic bubble level, vertical gyro, etc.). The algorithms may also be implemented in the electronic control unit (ECU) of a vehicle collecting raw inertial data from an IMU.

An angle output θg of a gyroscope may deviate due to Angle Random Walk (ARW) and Bias Instability (BI). An angle output θa of an accelerometer may deviate due to white noise and bias instability. Accordingly, the angles θa and θg may tend to diverge.

In an illustrative example of an exemplary general accelerometer weighting algorithm, a weighting calculation algorithm may include calculating a first factor, the log of the accelerometer error divided by a first constant, and the result of the log calculation, being raised to the power of a second constant. To calculate a second factor, the log of the accelerometer mean-value may be divided by the first constant, and the result of the log calculation may be raised to the power of the second constant. The first constant may promote a positive log value. The second constant may adjust the severity of the accelerometer dc-weighting, for example.

In some embodiments, the IMU may be employed within the rapidly expanding applications driven from the autonomous vehicle movement. In some examples, the IMU may be employed within a skid-steer, crawler, wheel-loader, and various forestry applications. In some embodiments, the IMU may be employed to avoid tip overs of grain harvesters, for example. The IMU may be employed within various autonomous vehicles, industrial and professional Unmanned Ariel Vehicles (UAVs), and enhanced worker categories.

In some examples, the IMU may be employed within structure and machine monitoring applications. For example, the IMU may be employed within construction, mining, silver rail vehicle stability and inclination. In some examples, the IMU may be employed within ground platform stabilization applications. For example, the IMU may be employed for stabilization of moving satellite communication and radio antennas on ships, trains, road vehicles, and aircraft. In some examples, stabilization and pointing in the direction of satellite signal sources may be areas of IMU installments. In yet other exemplary applications, the IMU may provide stabilization of gimbals, as may be used, for example, on cameras. Various other exemplary types of stabilization structures may employ the IMU, for example, drilling platforms.

In some embodiments, the IMU may provide precise motion control of various vehicle platforms. In some vehicle platform examples, the IMU may provide operation over various terrain. In some embodiments, the IMU may provide precise movement actuation and guidance over severe terrains and vehicle grades. In various examples, the IMU may provide payload characterization.

In some examples, the IMU may provide assisted control, for example, automation of repetitive movements and/or complex tasks through fusion of multiple sensing nodes. In an illustrative example, fusion may be provided by software implementing a Kalman filter on one or more accelerometers and/or one or more gyroscopes. In various examples, sensor fusion algorithms may calculate inclination angles during specific machine movements, and may be customized for specific applications. In various examples, the IMU may be powered by vehicle battery voltage (e.g., 12 VDC, 24 VDC).

In case of Global Positioning System (GPS) signal loss, the IMU may provide fully autonomous operation and safe harbor functions. Various implementations of the IMU may guide machine operators across various curves. Further, some machine operators may be provided substantial accuracy on lateral grades by employment of the IMU.

In various examples, the IMU may be provided in a rugged package. In such examples, the IMU may have robust packaging and may function successfully within a wide range of applications. For example, the IMU may withstand harsh environment conditions such as chemicals, UV resistance, IP67/IP69K sealing, as well as wide operating temperatures. Further, in some examples, the IMU may be hardened against various EMI, such as electrically (RF) noisy environments. In some examples, the IMU may include various RF emissions mitigations, which may advantageously provide electromagnetic compatibility (EMC). In some examples, the IMU may be hardened against heavy-duty vehicle battery power, load dump and electrical transients. In some embodiments, the IMU may provide 5V regulated power to various interfaces.

In various examples, the IMU may be CAN (Controller Area Network) compatible, and may therefore advantageously interface to a CAN bus. In some embodiments, the IMU may be field configurable. Field configurability may be provided through a boot loader. In such examples, common IMU hardware and basic software for different applications may be provided. Also, in various examples, the address of each IMU within a CAN bus may be field configurable. In some examples, the addresses may be configurable at various distribution sites. In various embodiments, the IMU may be compatible with other data protocols, for example RS-485, RS 488, RS-232, USB, Ethernet as well as various wireless protocols. In some examples, software upgrades may be performed without physically opening the IMU, which may advantageously keep calibration parameters and sensor performance intact.

In various embodiments, the IMU may provide sensor fusion algorithms, which may calculate accurate inclination angles during various machine movement. In such embodiments, MEMS (gyroscope) bias error over time may be compensated by vehicle speed information received through CAN bus. The IMU may be provided with an Aerospace-grade rotary calibration system, which may advantageously provide calibration consistency between units. Further, such systems may be factory calibrated.

In some embodiments, the IMU may include various mechanical features. For example, the IMU may include an Amp seal 16 connector (industrial grade), which may advantageously provide a stable supply chain. In various examples, the IMU may include various Deutsch connector options. In some examples, the IMU may include various bolt mounting configurations (e.g., M8). In some examples, the IMU may allow the end user to correct for mounting orientation differences.

In some embodiments, the IMU may be compatible with third-party hardware and computer applications. For example, the IMU may adhere to a formal protocol specification, and as such may operate on a network operable to such protocol specification.

In some examples, a computer network (e.g., CAN) may include a hardware sensor device with embedded software providing measuring and/or detecting. The embedded software in combination with an embedded controller may also be employed to transmit various data (e.g., temperature, pressure, motion). In some examples, the accelerometer and gyroscope output data may be configured with selectable data rate and nth order infinite impulse response (IIR) filter parameters. Algorithm inputs may also be filtered with the separate $n^{th}$ order (e.g., 5th order) IIR filters.

In some examples, pitch and roll may be calculated via a configurable sensor fusion algorithm. User selections accessible via CAN may include, for example, latency, output data rate, machine noise level, motion detection threshold, and mounting location. In various examples, vehicle motion information transmitted on a vehicle information bus (e.g., serial or parallel) may be read by the IMU and may further enhance accuracy.

An Inertial Measurement Unit (IMU) may generally refer to an electronic device that may be mounted within various vehicles undergoing attitude (pitch and roll) changes. IMUs may measure and report a vehicle's angular rate of change, by employment of a combination of accelerometers and gyroscopes. Although IMUs may be employed within Inertial Navigation Systems in various aircraft, including Unmanned Aerial Vehicles (UAVs), they may also be employed in various construction and farm implements. For example, an IMU may be employed within a skid-steer to determine the angle of incline of a landscaping project.

Kalman filters may be employed within the various algorithms found on an IMU. Kalman filters may be employed to determine a "best estimate of states" by combining measurements from various sensors in the presence of noise or in the absence of a sensor signal.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A method for improved control of a vehicle based on reliably determining whether the vehicle is in motion by an Inertial Measurement Unit (IMU) mounted on the vehicle, the method comprising:
    calculating, by a processor system of the IMU, a differential change in angular velocity for a gyroscope axis;
    comparing, by the processor system, the differential change to a predetermined differential velocity threshold;
    in response to determining that the differential change is less than the predetermined differential velocity threshold, calculating, by the processor system, a total variance of the angular velocity for the gyroscope axis over a time window, wherein the total variance is calculated using a sum of squares of differences between sequential gyroscope readings, wherein the sequential gyroscope readings are measured over a 50-millisecond time frame;
    in response to determining that the total variance is greater than a predetermined standard deviation threshold, determining, by the processor system, that the vehicle is in motion;
    setting, by the processor system, an in-motion flag based on the determination that the vehicle is in motion;
    controlling, by the processor system, a display device to display an indication of the determination that the vehicle is in motion;
    utilizing, by the processor system, the determination that the vehicle is in motion in calculating an attitude adjustment;
    determining, by the processor system, real-time spatial orientation of the vehicle based on the calculated attitude adjustment;

controlling, by the processor system, the display device to display the real-time spatial orientation of the vehicle; and controlling, by the processor system, the vehicle based at least in part on the real-time spatial orientation.

2. The method of claim 1, further comprising:
in response to determining that the differential change is less than the predetermined differential velocity threshold and the total variance is less than the predetermined standard deviation threshold, determining, by the processor system, that the vehicle is stationary.

3. The method of claim 1, wherein the differential change is calculated using differences between the sequential gyroscope readings.

4. The method of claim 1, wherein the vehicle comprises a road grader vehicle.

5. The method of claim 1, wherein the method comprises a timed interrupt routine.

6. The method of claim 1, wherein controlling the vehicle comprises causing an engine control unit (ECU) to operate the vehicle based at least in part on the real-time spatial orientation.

7. A computer program product (CPP) for improved control of a vehicle based on reliably determining whether the vehicle is in motion the CPP comprising a non-transitory computer-readable medium having computer-readable code embodied thereon, the computer-readable code capable of causing a processor to execute steps of:

calculating a differential change in angular velocity for a gyroscope axis;
comparing the differential change to a predetermined differential velocity threshold;
in response to determining that the differential change is less than the predetermined differential velocity threshold, calculating a total variance of the angular velocity for the gyroscope axis over a time window, wherein the total variance is calculated using a sum of squares of differences between sequential gyroscope readings;
in response to determining that the total variance is greater than a predetermined standard deviation threshold, determining that the vehicle is in motion;
setting an in-motion flag based on the determination that the vehicle is in motion;
controlling a display device to display an indication of the determination that the vehicle is in motion;
utilizing the determination that the vehicle is in motion in calculating an attitude adjustment;
determining real-time spatial orientation of the vehicle based on the calculated attitude adjustment;
controlling the display device to display the real-time spatial orientation of the vehicle controlling the vehicle based at least in part on the real-time spatial orientation.

8. The CPP of claim 7, wherein the steps further comprise:
in response to determining that the differential change is less than the predetermined differential velocity threshold and the total variance is less than the predetermined standard deviation threshold, determining that the vehicle is stationary.

9. The CPP of claim 7, wherein the differential change is calculated using differences between the sequential gyroscope readings.

10. The CPP of claim 7, wherein controlling the vehicle comprises causing an engine control unit (ECU) to operate the vehicle based at least in part on the real-time spatial orientation.

11. A computer system comprising:
a processor;
a memory operably coupled to the processor and including computer readable instructions that, when executed by the processor, cause the processor to perform operations to improve control of a vehicle based on reliably determine whether the vehicle is in motion, the operations comprising:
calculating a differential change in angular velocity for a gyroscope axis;
comparing the differential change to a predetermined differential velocity threshold;
in response to determining that the differential change is less than the predetermined differential velocity threshold, calculating a total variance of the angular velocity for the gyroscope axis over a time window, wherein the total variance is calculated using a sum of squares of differences between sequential gyroscope readings;
in response to determining that the total variance is greater than a predetermined standard deviation threshold, determining that the vehicle is in motion;
setting an in-motion flag based on the determination that the vehicle is in motion;
controlling a display device to display an indication of the determination that the vehicle is in motion;
utilizing the determination that the vehicle is in motion in calculating an attitude adjustment;
determining real-time spatial orientation of the vehicle based on the calculated attitude adjustment;
controlling the display device to display the real-time spatial orientation of the vehicle; and
controlling the vehicle based at least in part on the real-time spatial orientation.

12. The computer system of claim 11, wherein the operations further comprise:
in response to determining that the differential change is less than the predetermined differential velocity threshold and the total variance is less than the predetermined standard deviation threshold, determining that the vehicle is stationary.

13. The computer system of claim 11, wherein the differential change is calculated using differences between the sequential gyroscope readings.

14. The computer system of claim 11, wherein the vehicle comprises a road grader vehicle.

15. The computer system of claim 11, wherein controlling the vehicle comprises causing an engine control unit (ECU) to operate the vehicle based at least in part on the real-time spatial orientation.

* * * * *